(12) United States Patent
Bae et al.

(10) Patent No.: US 9,356,301 B2
(45) Date of Patent: May 31, 2016

(54) FLAT TUBULAR SOLID OXIDE FUEL CELL STACK

(75) Inventors: Joong Myeon Bae, Daejeon (KR); Joon Guen Park, Daejeon (KR)

(73) Assignee: KOREA ADVANCED INSTITUTE OF SCIENCE AND TECHNOLOGY (KR)

( * ) Notice: Subject to any disclaimer, the term of this patent is extended or adjusted under 35 U.S.C. 154(b) by 382 days.

(21) Appl. No.: 13/639,615

(22) PCT Filed: Apr. 6, 2011

(86) PCT No.: PCT/KR2011/002390
§ 371 (c)(1),
(2), (4) Date: Nov. 27, 2012

(87) PCT Pub. No.: WO2011/126289
PCT Pub. Date: Oct. 13, 2011

(65) Prior Publication Data
US 2013/0065153 A1    Mar. 14, 2013

(30) Foreign Application Priority Data

Apr. 7, 2010  (KR) .................. 10-2010-0031652

(51) Int. Cl.
| | |
|---|---|
| *H01M 8/24* | (2006.01) |
| *H01M 8/02* | (2016.01) |
| *H01M 8/12* | (2016.01) |
| *H01M 8/00* | (2016.01) |

(52) U.S. Cl.
CPC ............ *H01M 8/0247* (2013.01); *H01M 8/245* (2013.01); *H01M 8/2425* (2013.01); *H01M 8/2445* (2013.01); *H01M 8/004* (2013.01); *H01M 8/006* (2013.01); *H01M 2008/1293* (2013.01); *Y02E 60/50* (2013.01); *Y02E 60/525* (2013.01)

(58) Field of Classification Search
CPC .......................................... H01M 8/24–8/2495
USPC .......................................... 429/400–535, 463
See application file for complete search history.

(56) References Cited

U.S. PATENT DOCUMENTS

2005/0095483 A1*   5/2005   Song et al. ..................... 429/31

FOREIGN PATENT DOCUMENTS

| | | |
|---|---|---|
| JP | 2001068132 | 3/2001 |
| JP | 2003282101 | 10/2003 |
| JP | 2005339904 | 12/2005 |
| JP | 2005346989 | 12/2005 |
| JP | 2006079831 | 3/2006 |
| JP | 2006100091 | 4/2006 |
| JP | 2007035498 | 2/2007 |
| JP | 2007265896 | 10/2007 |
| JP | 2008135195 | 6/2008 |

OTHER PUBLICATIONS

Machine Translation of JP 2007-035498 originally published to Shimazu et al. on Feb. 8, 2007.*
International Search Report—PCT/KR2011/002390 dated Dec. 15, 2011.

* cited by examiner

*Primary Examiner* — Jonathan G Leong
(74) *Attorney, Agent, or Firm* — Cantor Colburn LLP

(57) ABSTRACT

Provided is a flat tubular solid oxide fuel cell stack, and more particularly, a flat tubular solid oxide fuel cell stack in which a connection member is interposed between a plurality of fuel cells to smoothly supply air and increase a contact area, in order to enable a stable electrical contact.

9 Claims, 8 Drawing Sheets

FLAT TUBULAR SOLID OXIDE FUEL CELL STACK

TECHNICAL FIELD

The present invention relates to a flat tubular solid oxide fuel cell stack, and more particularly, to a flat tubular solid oxide fuel cell stack in which a connection member is interposed between a plurality of fuel cells to smoothly supply air and increase a contact area, in order to enable stable electrical contact.

BACKGROUND ART

A fuel cell, which is a cell directly converting chemical energy produced by oxidation of electrical energy, is a novel, environment-friendly, and futuristic energy technology generating electrical energy from materials existing abundantly on earth, such as hydrogen and oxygen.

In a fuel cell stack, oxygen is supplied to a cathode, hydrogen is supplied to an anode, and an electrochemical reaction, which is a reverse reaction of electrolysis of water is performed to generate electricity, heat, and water, such that pollution is not generated and electrical energy is produced in high-efficiency.

Since the fuel cell stack does not have a limitation of a Carnot cycle which has a limitation in a heat engine of the related art, efficiency thereof may be increased to 40% or more. In addition, as described above, since the material to be discharged is only water, there is no risk of pollution, and since a mechanically operating portion is not necessary, unlike the heat engine of the related art, the fuel cell stack has various advantageous having a small size, no noise, and the like. Therefore, research into various technologies related to the fuel cell has actively progressed.

There are six kinds of fuel cell stacks, for example, a phosphoric acid fuel cell (PAFC), a molten carbonate fuel cell (MCFC), a solid oxide fuel cell (SOFC), a polymer electrolyte membrane fuel cell (PEMFC), a direct methanol fuel cell (DMFC), an alkaline fuel cell (AFC), or the like, according to a kind of electrolyte, and they are commercialized or in planning phase.

Since each of the fuel cells has various output range, usage, and the like, a fuel cell may be selected to be appropriate for the purpose. Among the fuel cells, in the SOFC, the electrolyte is relatively easy to be position-controlled, the position of the electrolyte is fixed, such that the electrolyte is not exhausted. In addition, since the SOFC is corrosion-resistant, life-span of the material thereof is long. Therefore, the SOFC has been highlighted for distributed generation, commercial, and home powers.

Chemical reaction schemes below show an operating principle of the SOFC in the case in which oxygen is supplied to the cathode and hydrogen is supplied to the anode.

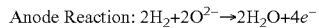

Anode Reaction: $2H_2 + 2O^{2-} \rightarrow 2H_2O + 4e^-$

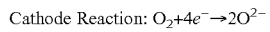

Cathode Reaction: $O_2 + 4e^- \rightarrow 2O^{2-}$

Here, the SOFC is generally manufactured in a stack type having a plurality of multilayered fuel cells in order to increase an output thereof. In the case in which the plurality of flat tubular fuel cells are manufactured in a stack type, a method of supplying air between each of the fuel cells and being conducted to each other is required.

However, since an empty space needs to be formed in order to supply air to the fuel cells, a contact area for conduction is decreased by the empty space.

In particular, in the case in which the fuel cell having a large area is formed, a surface thereof may frequently be uneven or bent, such that the contact area for conduction is more decreased. Therefore, a method of smoothly supplying air between the fuel cells and being conducted to each other is required.

DISCLOSURE

Technical Problem

An object of the present invention is to provide a flat tubular solid oxide fuel cell stack capable of including a connection member interposed between a plurality of fuel cells, thereby making it possible to smoothly supply air and increase a contact area in order to enable a stable electrical contact.

In particular, another object of the present invention is to provide a flat tubular solid oxide fuel cell stack capable of applying to a fuel cell having a large area using a simple method of forming a plurality of cut-part.

In addition, still another object of the present invention is to provide a flat tubular solid oxide fuel cell stack in which a spacing member allowing the air to be easily movable and supporting the fuel cell is included therein, thereby making it possible to be applied to forms in which the fuel cells are horizontally multilayered and the fuel cells are vertically multilayered.

Technical Solution

In one general aspect of the present invention, there is provided a flat tubular solid oxide fuel cell stack including: a plurality of fuel cells 100 including an anode support 110 in which a plurality of fuel transfer holes 111 transferring a fuel are formed, a connecting layer 120 formed at one side of the anode support 110, an electrolyte layer 130 formed on an outer peripheral surface other than the connecting layer 120 of the anode support 110, and a cathode 140 formed at an upper side of the electrolyte layer 130; a connection member 200 provided between the plurality of fuel cells 100 in a plate shape in which a cut-part 210 having a predetermined cut-region is protruded, having one side thereof contacting a cathode 140 of the fuel cell 100 and the other side thereof contacting the connecting layer 120 of the fuel cell 100 to thereby be electrically connected to each other, and allowing air to be movable; and a manifold 300 fixing the fuel cell 100 and supplying the fuel to the fuel transfer hole 111.

The connection member 200 may have the plurality of cut-parts 210 formed to be protruded in a direction of one side thereof, a direction of the other side thereof, or both directions.

The connection member 200 may have a trapezoid shape in which a width thereof is decreased in a protruded direction.

The connecting layer 120 may include a first connecting layer 121 formed to be wide at a predetermined region of the anode support 110 and a plurality of second connecting layers 122 formed at a predetermined region of an upper side of the first connecting layer 121.

The flat tubular solid oxide fuel cell stack 1000 may further include a spacing member 400 surrounding a circumference of the connection member 200 to maintain a spaced distance between the plurality of fuel cells 100.

The spacing member 400 may include a pair of plate parts 410 each supporting the fuel cells 100 of both sides thereof, and a plurality of height-forming parts 420 formed at a predetermined portion between the plate parts 410 to form a height, wherein air is movable to the cathode 140 through between the pair of plate parts 410.

The flat tubular solid oxide fuel cell stack 1000 may further include collecting members 500 provided on the fuel cells 100 disposed at both end portions thereof.

Advantageous Effects

As set forth above, the present invention relates to a flat tubular solid oxide fuel cell stack in which a connection member is interposed between a plurality of fuel cells to smoothly supply air and increase a contact area, in order to enable stable electrical contact.

In addition, with the flat tubular solid oxide fuel cell stack of the present invention, the plurality of cut-parts is formed in the plate shape member, which is a simple method, thereby forming the connection member to highly increase productivity, and stably forming the contact portion even in the fuel cell having the uneven surface and the large area.

Further, with the flat tubular solid oxide fuel cell stack of the present invention, the spacing member allowing the air to be easily movable and supporting the fuel cell is included therein, thereby making it possible to be applied to the forms in which the fuel cells are horizontally multilayered and the fuel cells are vertically multilayered, and highly increase the durability.

DESCRIPTION OF DRAWINGS

The above and other objects, features and advantages of the present invention will become apparent from the following description of preferred embodiments given in conjunction with the accompanying drawings, in which.

[Detailed Description of Main Elements]

Figure 1:
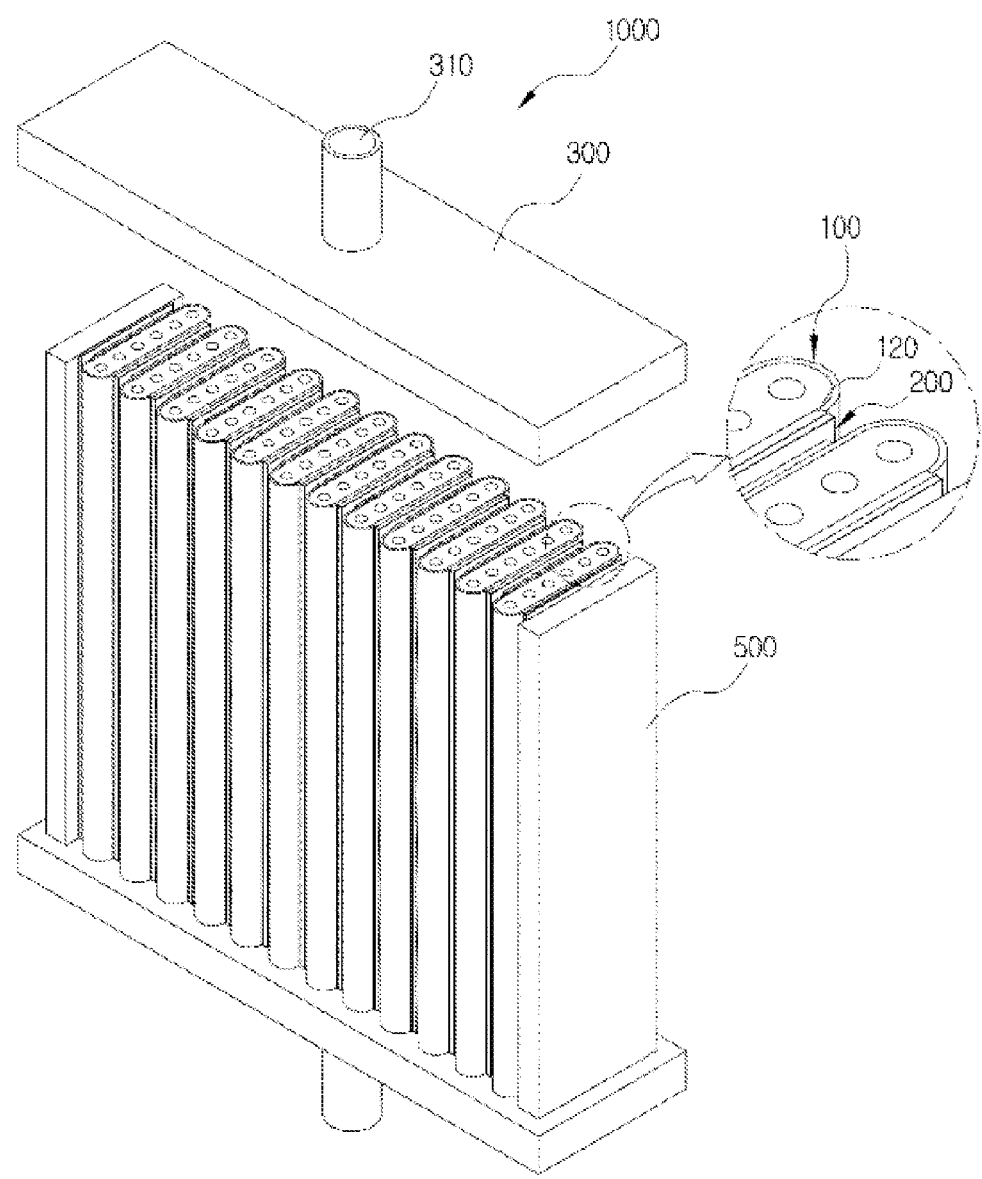
FIGS. 1 and 2 are a perspective view and a partial exploded perspective view of a flat tubular solid oxide fuel cell stack according to the present invention, respectively.

| | |
|---|---|
| 1000: FLAT TUBULAR SOLID OXIDE FUEL CELL STACK | |
| 100: FUEL CELL | |
| 110: ANODE SUPPORT | 111: FUEL TRANSFER HOLE |
| 120: CONNECTING LAYER | 121: FIRST CONNECTING LAYER |
| 122: SECOND CONNECTING LAYER | |
| 130: ELECTROLYTE LAYER | |
| 140: CATHODE | |
| 200: CONNECTION MEMBER | 210: CUT-PART |
| 300: MANIFOLD | 310: FUEL SUPPLY PART |
| 400: SPACING MEMBER | |
| 420: HEIGHT-FORMING PART | |
| 500: COLLECTING MEMBER | |

BEST MODE

Hereinafter, a flat tubular solid oxide fuel cell stack 1000 of the present invention having the above-described characteristics will be described in detail with reference to the accompanying drawings.

The flat tubular solid oxide fuel cell stack 1000 of the present invention includes a fuel cell 100, a connection member 200, and a manifold 300.

The fuel cell 100 is one unit including an anode support 110, a connecting layer 120, an electrolyte layer 130, and a cathode 140. The anode support 110 has a plurality of fuel transfer holes 111 which transfers a fuel thereinto and is formed to be long in a length direction.

The connecting layer 120 is formed on one side surface of the anode support 110 to form an electrical connection. A hydrogen gas which is a fuel moving inside of the anode support 110 is moved to produce an electron, resulting in generating electricity in an external circuit through the connecting layer 120.

Figure 2:
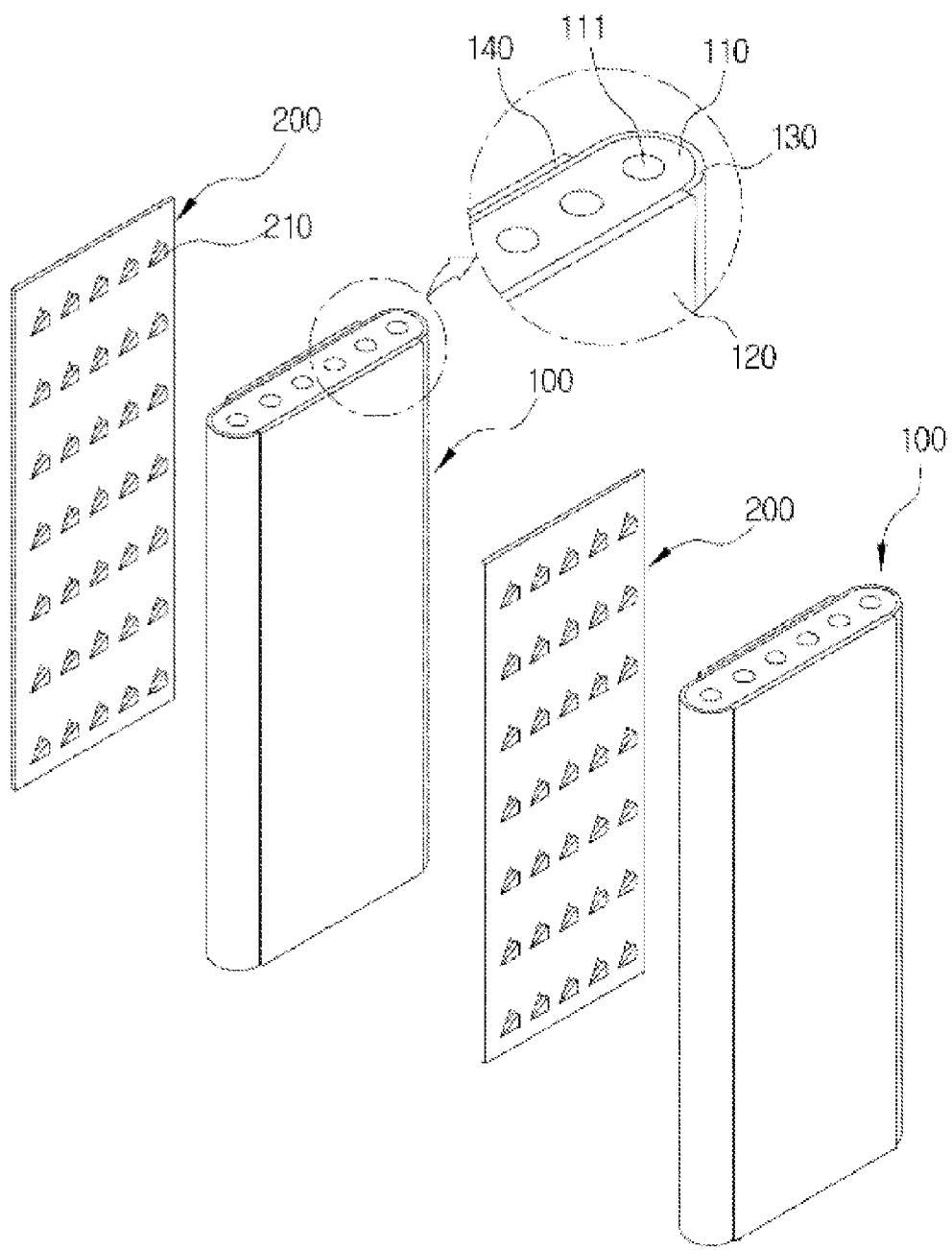

FIG. 2, which is a partial exploded perspective view of a flat tubular solid oxide fuel cell stack 1000 according to the present invention, shows an example in which the connecting layer 120 is formed in a single layer.

Figure 3:
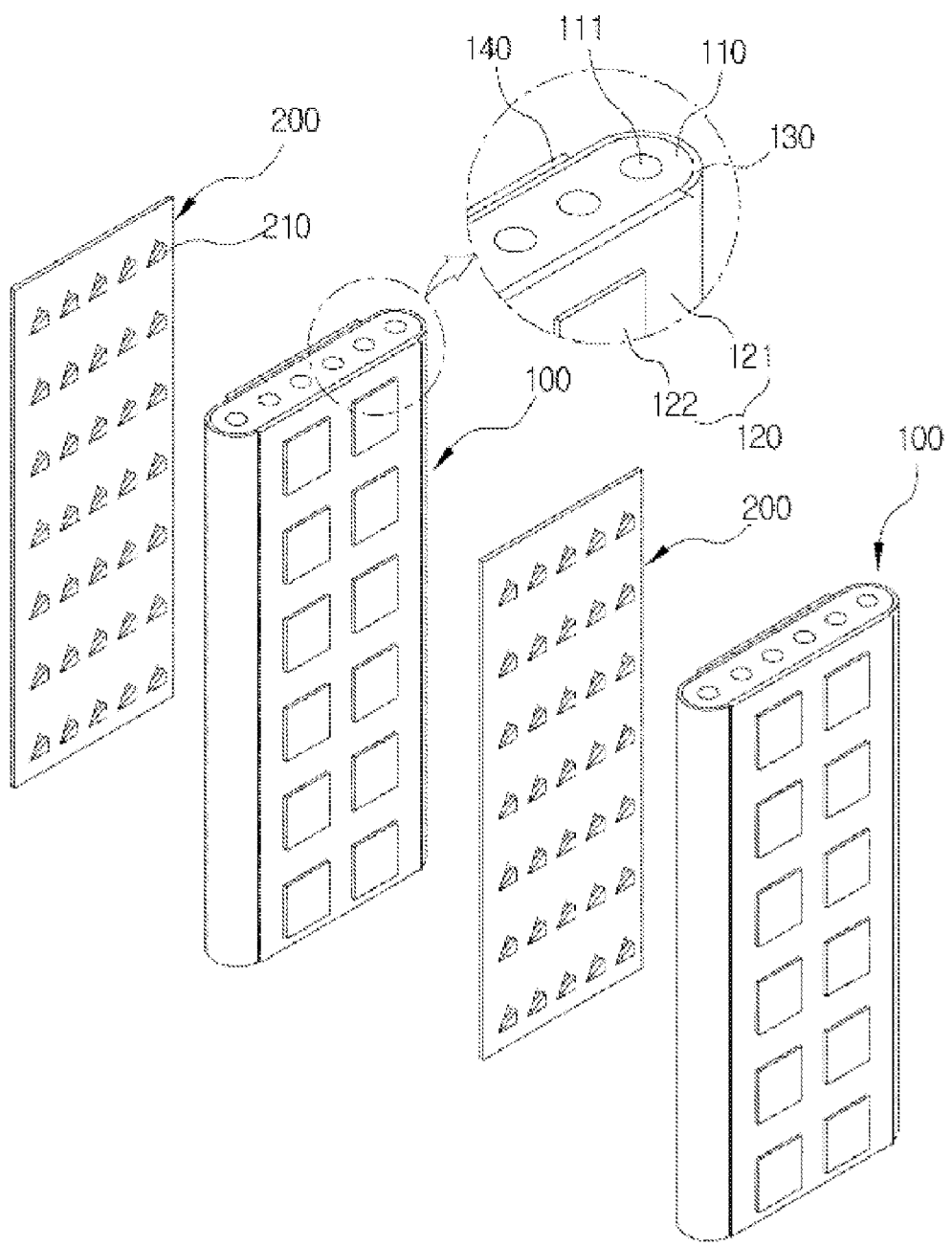
FIGS. 3 and 4 are another partial exploded perspective view and a cross-sectional view of a flat tubular solid oxide fuel cell stack according to the present invention, respectively.
Figure 4:
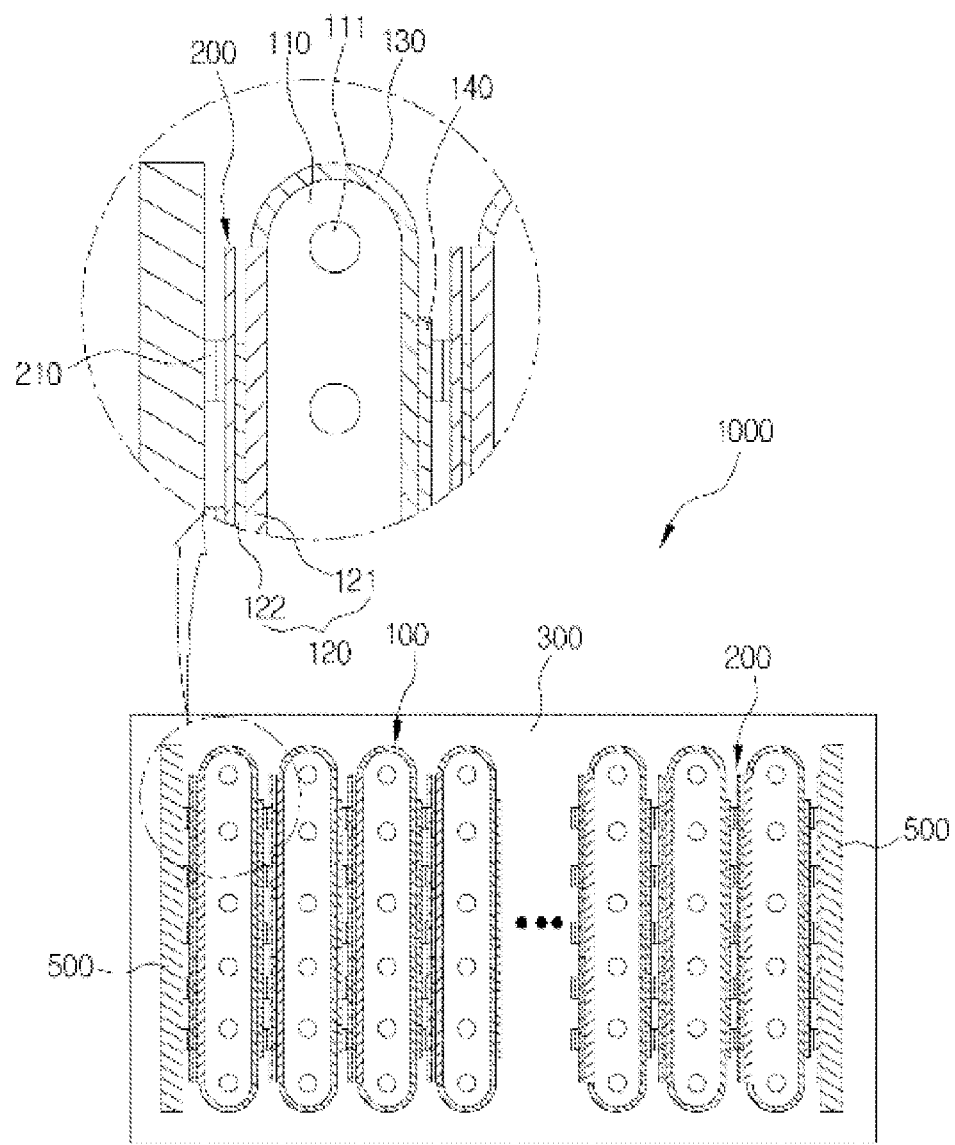

In addition, in the solid oxide fuel cell stack 1000 of the present invention, as shown in FIGS. 3 and 4, the connecting layer 120 may include a first connecting layer 121 formed to be wide at a predetermined region of the anode support 110 and a plurality of second connecting layers 122 formed at a predetermined region of an upper side of the first connecting layer 121.

In the case in which the connecting layer 120 includes the first connecting layer 121 and the second connecting layer 122, the plurality of second connecting layer 122 are formed at the upper side of the first connecting layer 121 to thereby form a space at which the air may flow between the fuel cell 100 and the connection member 200, such that the entire power production efficiency of the flat tubular solid oxide fuel cell stack 1000 may be more increased.

The electrolyte layer 130 surrounds an outer peripheral surface of the anode support 110 other than a portion at which the connecting layer 120 is formed.

The cathode 140 is formed at an upper side of the electrolyte layer 130 of the other side portion at which the connecting layer 120 is not formed.

In the flat tubular solid oxide fuel cell stack 1000 of the present invention, the fuel cell 100 is formed by the connecting layer 120, the anode support 110, the electrolyte layer 130, and the cathode 140, wherein the connecting layer 120, the anode support 110, the electrolyte layer 130, and the cathode 140 are positioned in a direction of one side of the fuel cell.

In addition, the electron produced by a contact of a fuel gas and the anode support 110 passes through the connecting layer 120 to generate electricity in the external circuit, and moves to the cathode 140 and is consumed while contacting the air in the cathode 140.

That is, the fuel gas is supplied through the fuel transfer hole 111 in the anode support 110 of the fuel cell 100, and the air is present at an outer portion of the fuel cell 100 to contact the cathode 140.

The plurality of fuel cells 100 are multilayered in a horizontal direction or a vertical direction in order to increase an overall output to be manufactured in a stack 1000 type, wherein the connection member 200 is provided between the fuel cells 100 in order that the electrical connection is formed between the fuel cells 100 and the air is smoothly supplied thereto.

The connection member 200 is formed in a plate shape at which a cut-part 210 having a predetermined cut-region of the connection member is protruded, and is contacted to one fuel cell 100 at one side thereof and the other fuel cell 100 at the other side thereof, respectively.

More specifically, in the case in which the plurality of fuel cells 100 are multilayered in the same direction, one side of the connection member contacts the cathode 140 of one fuel cell 100 and the other side thereof contacts the connecting layer 120 of the other fuel cell 100 to be electrically connected to each other, and the air is easily moved to the cathode 140 through a space formed by the protruded cut-part 210.

That is, the connection member 200 is provided between the fuel cells 100 to be electrically connected to each other, and a predetermined space is formed by the protruded cut-part 210, such that the air easily moves through the space, thereby smoothly supplying the air to the cathode 140.

Figure 5:
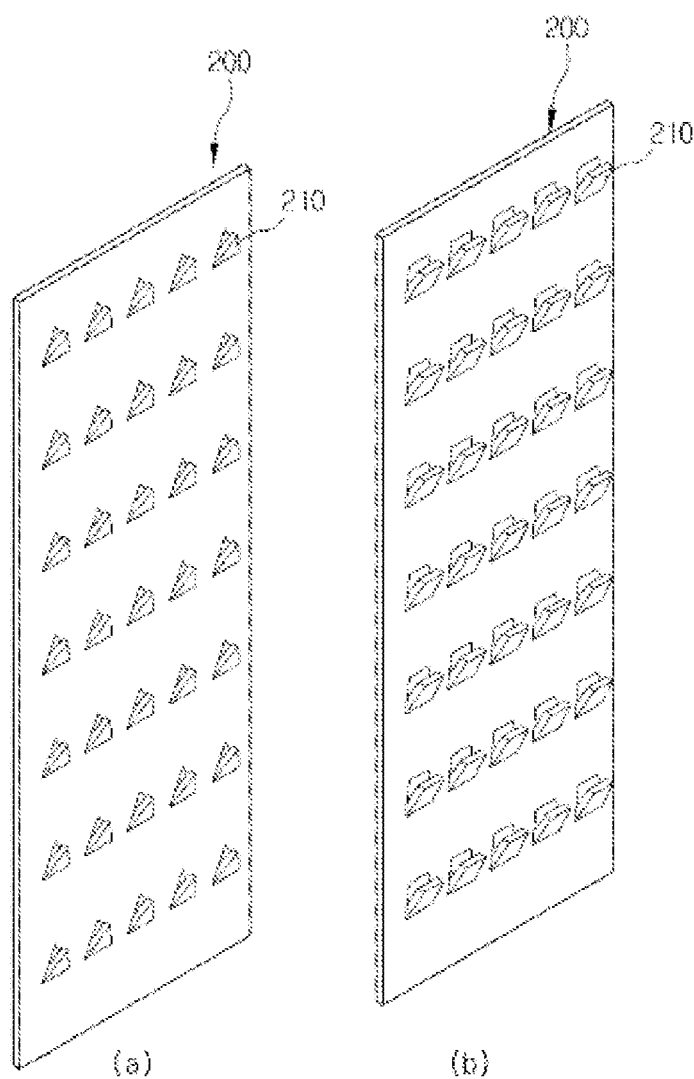
FIG. 5 is a perspective view showing a connection member of the flat tubular solid oxide fuel cell stack according the present invention.

FIG. 5 shows the connection member 200 having different cut-parts 210 of the flat tubular solid oxide fuel cell stack 1000 according to the present invention. In (a) of FIG. 5, the cut-part 210 having a triangle shape is formed, a portion other than one surface of the triangle is cut and protruded, and in (b) of FIG. 5, the cut-part 210 is formed in a trapezoid shape in which a width of the cut-part 210 is decreased in a protruded direction, and a portion other than a lower surface of the cut-part 210 is cut and protruded.

In particular, a portion at which one side of the cut-part 210 contacts may be stably secured in the trapezoid shape shown in (b) of FIG. 5, as compared to the triangle shape.

In the flat tubular solid oxide fuel cell stack 1000 of the present invention, a shape of the cut-part 210 of the connection member 200 may be variously formed.

In the flat tubular solid oxide fuel cell stack 1000 of the present invention, the cut-part 210 is protruded to form a gap, thereby allowing the air to be easily movable and increasing a contact area by the connection member 200, such that the fuel cell 100 formed so as to have a large area may be used.

In the case in which the fuel cell 100 of the related art has a large area, a surface of the cathode 140 or the connecting layer 120 is uneven or bent overall during manufacturing of the fuel cell 100, such that it is difficult to easily move the air or stably secure the contact area according to a shape of the connection member 200.

On the other hand, in the flat tubular solid oxide fuel cell stack 1000 of the present invention, the cut-part 210 of the connection member 200 is protruded to generate the gap between the fuel cells 100 by a region at which the cut-part 210 is protruded, thereby allowing the air to be smoothly movable, and one side surface of a plate shape member contacts to one fuel cell 100 and the other side surface thereof contacts to the other fuel cell 100, thereby stably securing electrical performance.

Figure 6:
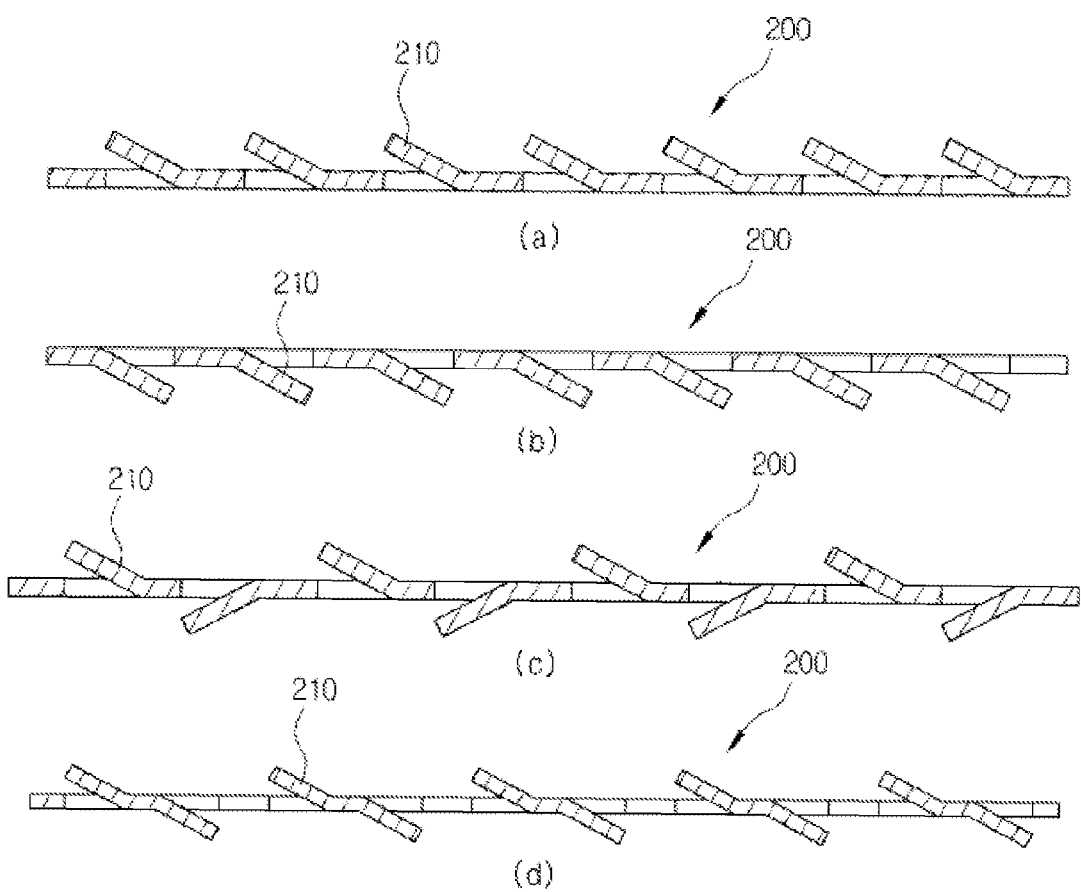
FIG. 6 is a cross-sectional view showing the connection member of the flat tubular solid oxide fuel cell stack according the present invention.

FIG. 6 shows various connection member 200 shapes. In the flat tubular solid oxide fuel cell stack 1000 of the present invention, the cut-part 210 may be formed to have various shapes and be variously protruded.

In (a) of FIG. 6, the cut-part 210 is upwardly protruded; in (b) of FIG. 6, the cut-part 210 is downwardly protruded; and in (c) and (d) of FIG. 6, one portion of the cut-part 210 is upwardly protruded and the other portion thereof is downwardly protruded.

Here, in (c) of FIG. 6, the cut-parts 210 which are upwardly and downwardly protruded are formed in the same cut direction, and in (d) of FIG. 6, the cut-parts 210 which are upwardly and downwardly protruded are alternately formed in oppositely cut directions.

The manifold 300 fixes the fuel cell 100, supplies the fuel to the fuel transfer hole 111, and has a fuel supply part 310 supplying the fuel.

In the fuel supply part 310, the fuel is transferred to the manifold 300, and includes a flow path at which an inner portion of the manifold 300 is hollow to thereby supply the fuel to each of the fuel transfer holes 111 of the plurality of fuel cells 100.

Meanwhile, the flat tubular solid oxide fuel cell 100 of the present invention may further include collecting members 500 provided on the fuel cells 100 disposed at both end portions, so as to increase collecting efficiency and further improve durability of the fuel cell 100.

The collecting member 500 may be fixed to the manifold 300 together with the fuel cell 100, and the connection member 200 is preferably formed between the fuel cell 100 positioned at the outermost side and the collecting member 500.

Here, the connection member 200 contacts the fuel cell 100 at one side thereof and contacts the collecting member 500 at the other side thereof.

Figure 7:
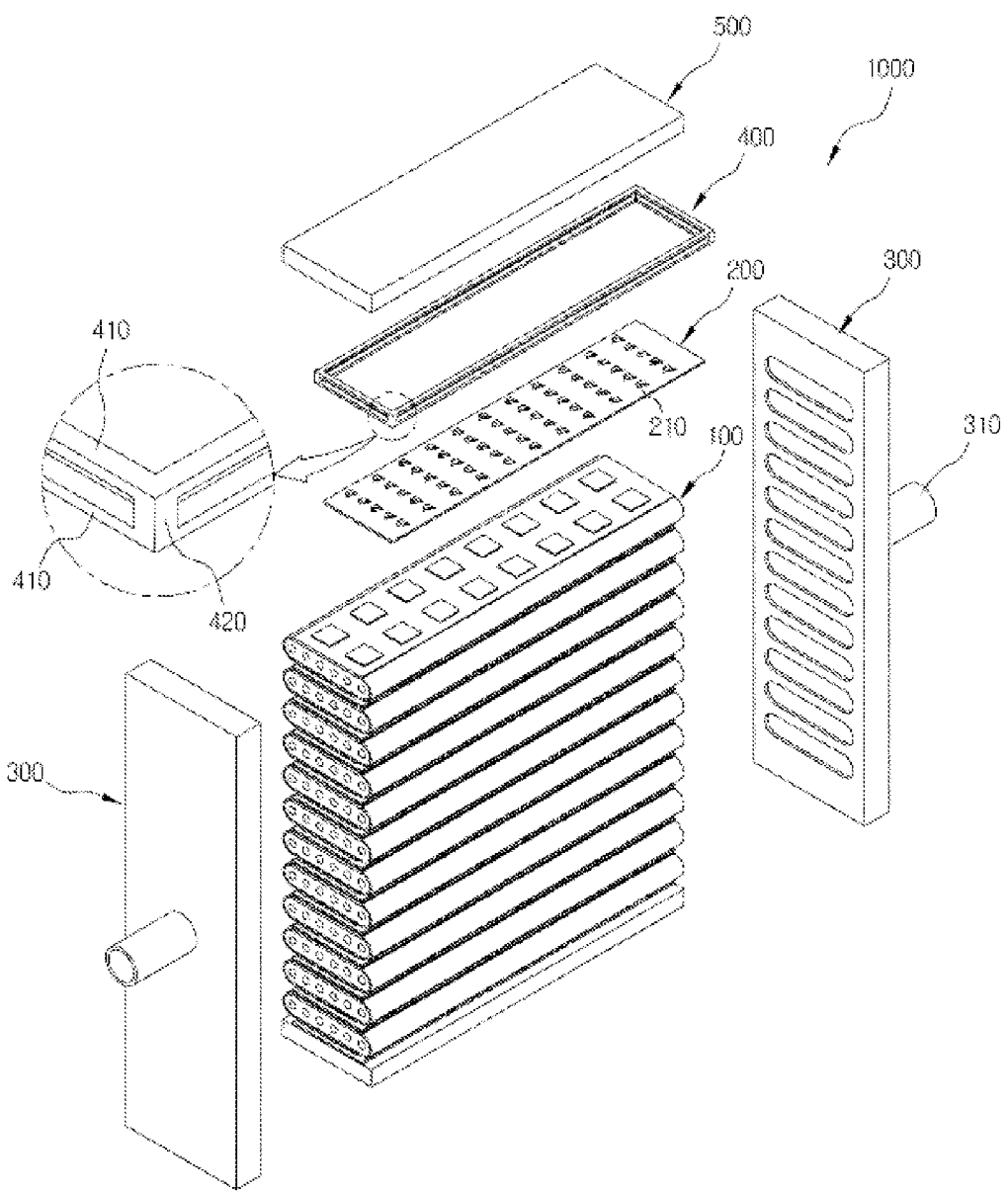
FIGS. 7 and 8 are another exploded perspective view and a cross-sectional view of a flat tubular solid oxide fuel cell stack according to the present invention, respectively.
Figure 8:
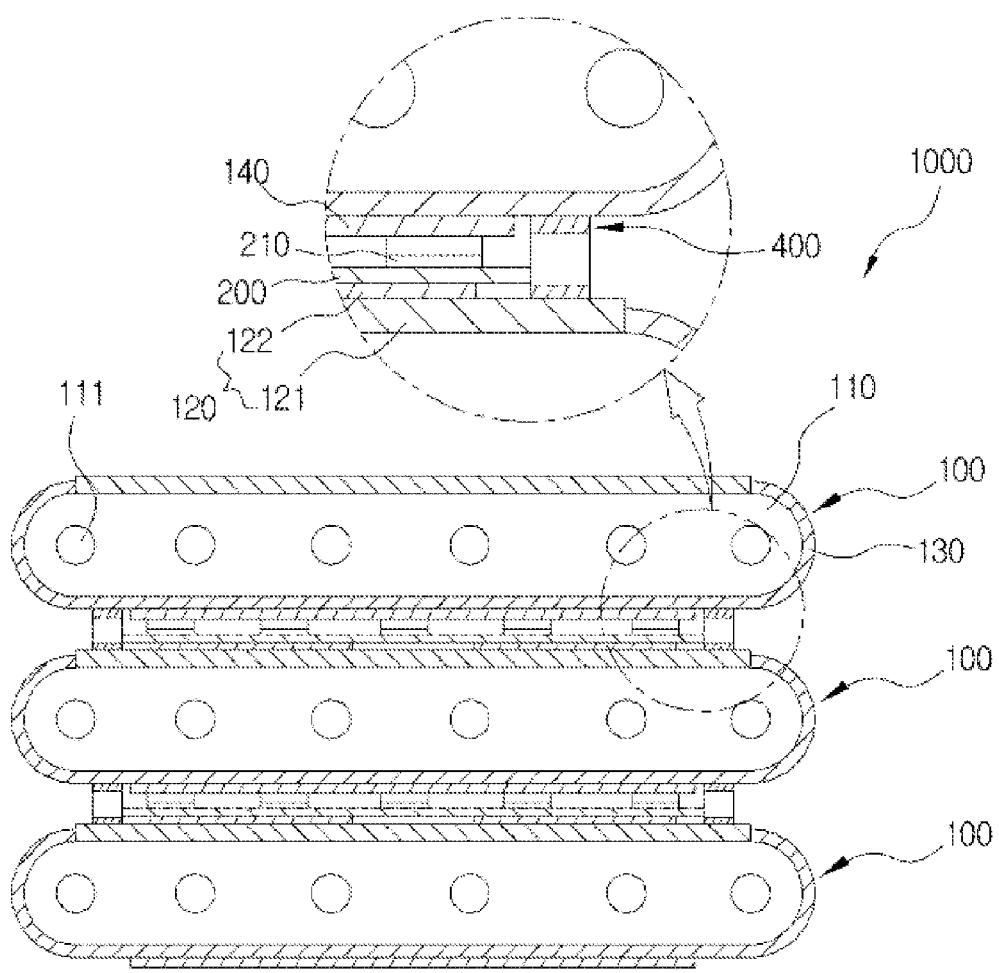

FIGS. 1 to 4 show the case in which the fuel cells 100 are multilayered in a direction in parallel with a horizontal direction by way of example; however, the flat tubular solid oxide fuel cell stack 1000 of the present invention is not limited thereto. As shown in FIGS. 7 and 8, the fuel cells may be multilayered in a vertical direction.

However, in the case in which the fuel cells 100 are multilayered in a vertical direction, since a shape of the protruded cut-part 210 of the connection member 200 may be modified by a load, it is preferable to further include the spacing member 400 maintaining a spacing distance between the fuel cells 100.

The spacing member 400 includes the connection member 200 therein to be vertically connected to the fuel cells 100 of both sides thereof. Here, it is preferable to include a pair of plate parts 410 each supporting the fuel cells 100 of both sides thereof, and a plurality of height-forming parts 420 formed at a predetermined portion between the plate parts 410 to form a height, so as not to disturb the movement of the air.

Here, it is preferable that the height-forming part 420 is formed only at the minimum region, thereby allowing the air to be easily movable to the cathode 140 through between the plate parts 410.

In the drawings, the case in which the spacing member 400 has a pair of plate parts 410 closely formed on the electrolyte layer 130 adjacent to the connecting layer 120 of fuel cell 100 of one side and closely formed on the electrolyte layer 130 adjacent to the cathode 140 of fuel cell 100 of the other side, and the entire height of the spacing member 400 is the same as each height of the cathode 140, the connection member 200 (including the protruded portion of the cut-part 210), and the connecting layer 120 of the fuel cell 100 of one side is shown by way of example.

The height of the spacing member 400 may be variously formed according to a configuration shape of the inner portion.

As described above, in the flat tubular solid oxide fuel cell stack 1000 of the present invention, the fuel and the air may be smoothly movable even in the case in which the fuel cells 100 are multilayered in a horizontal type and a vertical type. In addition, the plurality of fuel cells 100 are electrically connected to each other using the connection member 200, thereby stably securing the power production efficiency of the fuel cells 100.

The present invention is not limited to the above-mentioned exemplary embodiments, may be variously applied, and may be variously modified without departing from the gist of the present invention claimed in claims.

The invention claimed is:

1. A flat tubular solid oxide fuel cell stack comprising:
a plurality of fuel cells including an anode support in which a plurality of fuel transfer holes transferring a fuel are formed, a connecting layer formed at one side of the anode support, an electrolyte layer formed on an outer peripheral surface other than the connecting layer of the anode support, and a cathode formed at an upper side of the electrolyte layer;
a connection member provided between the plurality of the fuel cells and formed of a plate, wherein the connection member includes a plurality of first protruded cut-parts formed on the plate, each of the first protruded cut-parts is formed of one portion remaining attached to the plate and the other portion protruding from the plate in one direction while leaving a through-hole in the plate, the other portion having a same shape as that of the through-hole, and wherein one side of the connection member contacts a cathode of the fuel cell and the other side thereof contacts the connecting layer of the fuel cell to thereby be electrically connected to each other even when the fuel cell has an uneven surface to be contacted, and allowing air to be movable;
a manifold fixing the fuel cell and supplying the fuel to the plurality of the fuel transfer holes; and
a spacing member surrounding a circumference of the connection member to maintain a spaced distance between the plurality of the fuel cells so as to prevent the protruded cut-parts from being modified in shape, wherein the spacing member includes a pair of plate parts each forming a frame shape and supporting the fuel cells, and a plurality of height-forming parts formed at a predetermined portion between the plate parts to form a space in-between, and wherein air is movable to the cathode through the space.

2. The flat tubular solid oxide fuel cell stack of claim 1, wherein the connection member include a plurality of second protruded cut-parts protruding from the plate in the other direction opposite to the one direction.

3. The flat tubular solid oxide fuel cell stack of claim 1, wherein the other portion has a trapezoid shape in which a width thereof is decreased toward the one direction.

4. The flat tubular solid oxide fuel cell stack of claim 1, wherein the connecting layer includes a first connecting layer formed to be wide at a predetermined region of the anode support and a plurality of second connecting layers formed at a predetermined region of an upper side of the first connecting layer.

5. The flat tubular solid oxide fuel cell stack of claim 1, further comprising collecting members provided on the fuel cells disposed at both end portions thereof.

6. The flat tubular solid oxide fuel cell stack of claim 2, further comprising collecting members provided on the fuel cells disposed at both end portions thereof.

7. The flat tubular solid oxide fuel cell stack of claim 3, further comprising collecting members provided on the fuel cells disposed at both end portions thereof.

8. The flat tubular solid oxide fuel cell stack of claim 4, further comprising collecting members provided on the fuel cells disposed at both end portions thereof.

9. The flat tubular solid oxide fuel cell stack of claim 1, wherein the other portion has a triangular shape in which a width thereof is decreased toward the one direction.

* * * * *